United States Patent [19]

Cohn et al.

[11] Patent Number: 5,166,267

[45] Date of Patent: Nov. 24, 1992

[54] RUBBER COMPOSITION HAVING HIGH TENACITY, HIGH MODULUS AND GOOD CUT GROWTH RESISTANCE

[75] Inventors: Gerald Cohn; Douglas D. Callander, both of Akron; William C. T. Tung, Tallmadge, all of Ohio

[73] Assignee: The Goodyear Tire & Rubber Company, Akron, Ohio

[21] Appl. No.: 583,104

[22] Filed: Sep. 17, 1990

[51] Int. Cl.⁵ .................... C08L 67/02; C08L 9/00; C08L 9/06

[52] U.S. Cl. .................... 525/177; 525/173; 525/175

[58] Field of Search .......................... 525/177

[56] References Cited

U.S. PATENT DOCUMENTS

| | | | |
|---|---|---|---|
| 3,963,802 | 6/1976 | Shih | 525/177 |
| 4,016,221 | 4/1977 | Kundo | 525/177 |
| 4,141,863 | 2/1979 | Coran | 525/177 |
| 4,290,927 | 9/1981 | Tanaka et al. | 260/3 |
| 4,594,388 | 6/1986 | Arai | 525/177 |
| 4,694,042 | 9/1987 | McKee | 525/66 |
| 4,717,751 | 1/1988 | Yates | 525/166 |
| 4,753,980 | 6/1988 | Deyrup | 524/369 |
| 4,843,124 | 6/1989 | Wolfe, Jr. | 525/92 |

*Primary Examiner*—Patricia A. Short
*Attorney, Agent, or Firm*—Alvin T. Rockhill

[57] ABSTRACT

It is desirable to increase the modulus of rubbers utilized in a wide variety of applications. For example, it is typically desirable to increase the modulus of rubber compounds which are utilized in tire tread base compositions and in tire wire coat compounds. Unfortunately, most conventional techniques for increasing the modulus of a rubber compound are detrimental to other rubber properties, such as hysteresis and cut growth resistance. By utilizing the techniques of this invention rubber compounds can be prepared which exhibit high tensile strength, high modulus, and good cut growth resistance. The subject invention specifically relates to a process for preparing a highly dispersed blend of a polyester in an elastomer which comprises (1) blending a solution of a rubber in an organic solvent with a solution of a polyester in an organic solvent to produce a dispersion containing said rubber and said polyester, and (2) recovering the highly dispersed blend from the dispersion. This process can be used to increase the modulus of virtually any type of rubber including cis-1,4-polybutadiene, styrene-butadiene rubber (SBR) polyisoprene, isoprene-butadiene rubber, isoprene-butadiene-styrene rubber (SIBR), nitrile rubber, and the like.

15 Claims, No Drawings

RUBBER COMPOSITION HAVING HIGH TENACITY, HIGH MODULUS AND GOOD CUT GROWTH RESISTANCE

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in tire tread base compounds by simply adding higher levels of fillers or curatives.

SUMMARY OF THE INVENTION

The elastomeric compositions of this invention are prepared by dispersing a polyester throughout a rubber. This is done by blending a solution containing the rubber with a solution containing the polyester and then subsequently coagulating the dispersion to recover a highly dispersed blend of the polyester in the rubber. This highly dispersed blend is an elastomeric composition which exhibits high modulus, high green strength and good cut growth resistance. This process can be employed to increase the modulus of virtually any type of elastomer, such as polyisoprene, high cis-1,4-polybutadiene, styrene-butadiene rubber (SBR), and the like. Polyethylene terephthalate (PET) is a preferred polyester for use in the practice of this invention.

The subject invention specifically discloses a process for preparing an elastomeric composition having a high modulus and high green strength which comprises (1) blending a solution of a rubber with a solution of a polyester to produce a rubber/polyester dispersion, and (2) coagulating the rubber/polyester dispersion to recover said elastomeric composition.

The subject invention also reveals a process for preparing a highly dispersed blend of a polyester in an elastomer which comprises (1) blending a solution of a rubber in an organic solvent with a solution of a polyester in an organic solvent to produce a dispersion containing said rubber and said polyester, and (2) recovering the highly dispersed blend from the solution.

DETAILED DESCRIPTION OF THE INVENTION

The process of this invention can be utilized to increase the modulus of virtually any type of rubbery elastomer. The rubbers which are modified in accordance with this invention typically contain repeat units which are derived from conjugated diene monomers and/or nonconjugated diene monomers. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The rubbery elastomer can also contain various vinyl aromatic monomers, such as styrene, 1-vinylnaphthalene, 2-vinylnaphthalene, α-methylstyrene, 4-phenylstyrene, 3-methylstyrene, and the like. Some representative examples of rubbers that can be modified by utilizing the procedure of this invention include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber, and EPDM rubber. The technique of this invention is particularly well suited for increasing the modulus of polyisoprene, SBR and cis-1,4-polybutadiene.

In making the highly dispersed blends of this invention a solution of the rubber is thoroughly mixed with a solution of the polyester. The rubber solution (rubber cement) can be prepared by dissolving a dry rubber in a suitable organic solvent. However, if the rubber is prepared by solution polymerization there is no need to recover it from the solvent in which the polymerization was carried out before blending it with the polyester solution. Such solution rubbers can be prepared by any standard solution polymerization technique.

The organic solvent utilized in the rubber solution will typically be a saturated aliphatic hydrocarbon or an aromatic hydrocarbon. Such organic solvents will normally contain from about 5 to about 12 carbon atoms per molecule and will be liquids at room temperature. Some representative examples of suitable aromatic solvents include benzene, toluene, xylenes, ethylbenzene, diethylbenzene, isobutylbenzene, and the like. Some representative examples of suitable aliphatic solvents include n-hexane, cyclohexane, methylcyclohexane, isohexanes, n-heptane, n-octane, isooctanes, n-decane, 2,2-dimethylbutane, petroleum ether, kerosene, petroleum spirits, petroleum naphtha, and the like. Halogenated hydrocarbons, such as chloroform, methylene chloride, tetrachloroethane and the like, can also be employed as the organic solvent.

The rubber cements utilized in the practice of this invention will typically contain from about 5 weight percent to about 35 weight percent rubber, based upon the total weight of the rubber cement. It is typically preferred for the solution of the rubber to contain from about 10 weight percent to about 30 weight percent rubber. It will generally be more preferred for the rubber cement to contain from about 15 weight percent to about 25 weight percent rubber.

A wide variety of polyesters can be utilized in making the elastomeric compositions of this invention. Such polyesters are typically prepared by reacting a diol component with a diacid component. The diol component utilized in preparing such polyesters will normally be selected from the group consisting of glycols containing from 2 to 12 carbon atoms, glycol ethers containing from 4 to 12 carbon atoms, and polyether glycols having the structural formula:

wherein A is an alkylene group containing from 2 to 6 carbon atoms and wherein n is an integer from 2 to 400. Generally, such polyether glycols will have a molecular weight of 400 to about 4000.

Preferred glycols normally contain from 2 to 8 carbon atoms with preferred glycol ethers containing from 4 to 8 carbon atoms. Some representative examples of glycols that can be utilized as the diol component include ethylene glycol, 1,3-propylene glycol, 1,2-propylene glycol, 2,2,-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4,-tetramethyl-1,3-cyclobutane diol, and the like. Ethylene glycol is a highly preferred glycol for use in making polyesters which can be used in the practice of this invention. It is often preferred for the diol component to consist essentially of ethylene glycol.

The diacid component used in making polyesters will typically be comprised of alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain 9 to 22 carbon atoms, or diesters of alkyl substituted aryl dicarboxylic acids which contain from 11 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred diesters of alkyl dicarboxylic acids will contain from 6 to 12 carbon atoms. The preferred aryl dicarboxylic acids contain from 8 to 16 carbon atoms. Some representative examples of aryl dicarboxylic acids include terephthalic acid, isophthalic acid and orthophthalic acid. The preferred diesters of aryl dicarboxylic acids contain from 10 to 18 carbon atoms. Some representative examples of diesters of aryl dicarboxylic acids include dimethyl terephthalate, dimethyl isophthalate, diethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

Polyesters which are useful in making the high modulus elastomeric compositions of this invention can be synthesized utilizing conventional polymerization techniques which are well known in the art. Thus, conventional temperatures, catalysts, amounts of catalysts, stabilizers and the like, are used in manners well known in the literature and art. For instance, a two step process can be utilized in preparing such polyesters. In cases where diesters are utilized as the diacid component in the first step, known as the transesterification stage, the diacid component and the diol component can be heated to a temperature which is within the range of 150° C. to about 240° C. under an inert gas atmosphere, such as nitrogen or a Noble gas. For economic reasons, nitrogen will usually be utilized. This polymerization reaction can be carried out in the presence of appropriate catalysts, such as titanium alkoxides, tetraalkyl titanium compounds, or zinc acetates. In cases where diacids are utilized as the diacid component, the diacid component and the diol component are heated to a temperature which is within the range of about 240° C. to about 290° C. at a pressure of about 10 psi ($6.9 \times 10^4$ Pa) to about 70 psi ($4.8 \times 10^5$ Pa). A catalyst is normally not utilized in such esterification steps. In the second step, the polycondensation reaction can be carried out under a reduced pressure of less than about 0.5 mm of mercury (66.7 Pascals) at a temperature which is typically in the range of about 230° C. to about 300° C. The polymerization time required will vary with the amount and type of catalyst used as well as the polymerization temperature utilized. The extent of the polycondensation will also depend somewhat on the desired molecular weight of the copolyester being synthesized. It is desirable for the polyester to have an IV (intrinsic viscosity) of at least about 0.4 dl/g in a 60:40 phenol:tetrachloroethane solvent system at a temperature of 30° C. It is normally preferred for the polyester to have an IV which is within the range of about 0.6 dl/g to about 6.0 dl/g. It is generally most preferred for the polyester to have an IV which is within the range of about 1.0 dl/g to about 3.0 dl/g.

A solution of the desired polyester is prepared by simply dissolving the polyester in a suitable solvent. The solvent selected will vary with the type and molecular weight of the polyester chosen. Normally a wide variety of solvents or solvent systems capable of dissolving the polyester at room temperature or at a slightly elevated temperature can be employed. Polyethyleneterephthalate (PET) is a highly preferred polyester. Some representative examples of suitable solvents in which PET can be dissolved include nitro-benzene, trifluoroacetic acid, acetonapthone, hexafluoroacetone hexafluoroisopropanol, meta-cresol, trifluoroacetic acid/methylene chloride mixed solvent systems, nitrobenzene/tetrachloroethane mixed solvent systems, hexafluoroisopropanol/chloroform mixed solvent systems, and tetrachloroethane/phenol mixed solvent systems. Trifluoroacetic acid/methylene chloride mixed solvent systems which contain from about 25 weight percent to about 75 weight percent trifluoroacetic acid and from about 25 weight percent to about 75 weight percent methylene chloride are preferred. It is generally more preferred for such solvent systems to contain from about 40 to about 60 weight percent trifluoroacetic acid and from about 40 to about 60 weight percent methylene chloride. The concentration of the polyester solution will vary with the type of polyester, the polyester molecular weight, the polyester crystallinity, and with the solvent system being employed. For example, the maximum concentration of PET which can be dissolved in a solvent system containing 50 weight percent trifluoroacetic acid and 50 weight percent methylene chloride decreases from about 40% at an IV of 0.6 dl/g, to 30% at an IV of 1.0 dl/g, to 25% at an IV of 2.0 dl/g, to about 15% at an IV of 4.5 dl/g.

In making the elastomeric compositions of this invention a solution of the rubber is simply blended with a solution of the polyester. The solutions are thoroughly mixed together to attain an essentially homogenous rubber/polyester dispersion. The elastomeric composition is subsequently recovered from the rubber/polyester dispersion. The elastomeric composition recover is a highly dispersed blend of the polyester in the elastomer. Because the polyester is extremely well dispersed throughout the rubber the elastomeric composition exhibits high modulus, high green strength, and a high level of resistance to cut growth.

The elastomeric composition is recovered from the rubber/polyester dispersion by removal of the organic solvent. This can be accomplished by evaporation, coagulation, or any other suitable means. In most commercial operations, it will be preferred to recover the elastomeric composition from the rubber/polyester dispersion by coagulation. In such a coagulation process, the rubber/polyester dispersion can be coagulated by simply pouring it into an organic solvent which is capable of dissolving the organic solvent system in which the rubber and polyester is dispersed but which is not a good solvent for the rubber or polyester. In some cases it is preferable to add a suitable coagulating agent to the rubber/polyester dispersion to induce coagulation. Alcohols and ketones can typically be utilized in such coagulation procedures. Some representative examples of alcohols which can be utilized include methanol, ethanol, isopropyl alcohol, n-propyl alcohol, cyclohexanol, n-butyl alcohol, isobutyl alcohol, s-butyl alcohol, t-butyl alcohol, and n-pentanol. Some representative examples of ketones which can be used in the coagulation procedure include acetone, methylethylketone, methylphenolketone, cyclohexanol, and the like.

After coagulation the elastomeric composition can be recovered from the organic solvents by decantation or filtration. It is often desirable to squeeze residual organic solvents from the elastomeric composition by mechanical means, such as squeeze rollers. Additional residual organic solvent can subsequently be removed by evaporation. The evaporation of residual solvent can be accelerated by heating the elastomeric composition to a slightly elevated temperature. This temperature will generally be within the range of about 25° C. to about 125° C. Higher temperatures can lead to polymer degradation and are accordingly undesirable. It is also generally beneficial to increase the surface area of the elastomeric composition to facilitate the evaporation of residual organic solvent. It is normally desirable to utilize vacuum to accelerate the rate at which the residual organic solvent evaporates from the rubber/polyester blend.

In practicing this invention the polyester solution will be blended with the rubber solution in amounts whereby the highly dispersed blend of the polyester in the elastomer will contain from about 1 phr to about 55 phr (parts per hundred parts of rubber) of polyester. In most cases, it will be preferred for the elastomeric composition to contain from about 2 phr to about 40 phr of the polyester. It will typically be more preferred for the elastomeric composition to contain from about 5 phr to about 20 phr of the polyester.

This invention is illustrated by the following working examples which are presented merely for the purpose of illustration and are not to be regarded as limiting the scope of the invention or the manner in which it can be practiced. Unless specifically indicated otherwise, parts and percentages are given by weight.

EXAMPLE 1

In this experiment a high modulus elastomeric composition was prepared by the technique of this invention. In the procedure utilized 500 grams of a 20 percent solution of synthetic polyisoprene (Natsyn ®) in hexane was diluted with 1,800 ml of methylene chloride. Then 80 ml of a polyethylene terephthalate in a mixed solvent system containing 50 percent trifluoroacetic acid and 50 percent methylene chloride was added with rapid stirring. The polyethylene terephthalate solution contained 10 grams of polymer which had an intrinsic viscosity of 1.9. The resulting dispersion was poured into excess isopropanol and an opaque elastomer precipitated. The elastomer which was recovered was washed with additional isopropanol and subsequently dried in a vacuum oven at 40° C. for 16 hours.

The elastomeric composition recovered was then compression molded at 100° C. into 4"×4"×⅛" (10.2 cm×10.2 cm×3.2 mm) sheets. The sheets were cut into "dumbbell" test strips which were ⅛" (3.2 mm) wide. The test strips were then evaluated in an Instron tensile machine at 20" (51.8 cm) per minute to determine their tensile modulus and tensile strength. Control samples which consisted totally of the synthetic polyisoprene were also evaluated. The results of this tensile testing are as follows.

| | Tensile Modulus (Pa) | | Tensile Strength (Pa) |
|---|---|---|---|
| | 50% | 100% | |
| Polyisoprene (control) | $6.3 \times 10^4$ | $1.2 \times 10^5$ | $1.6 \times 10^5$ |
| Polyisoprene/ PET Blend | $1.2 \times 10^5$ | $2.0 \times 10^5$ | $3.7 \times 10^5$ |

As can be seen the incorporation of 10 phr of PET into the synthetic polyisoprene by the technique of this invention very substantially increased both tensile modulus and tensile strength. More specifically, at 50 percent and 100 percent elongation the tensile modulus of the samples was increased by 91 percent and 67 percent, respectively. The tensile strength of the polyisoprene was increased by 131 percent. This example clearly shows that the technique of this invention can be utilized to greatly improve the tensile modulus and tensile strength of rubbers.

EXAMPLE 2

In this experiment a high modulus elastomeric composition was made using the procedure described in Example 1 except that only 8.6 grams of PET was in the polyester solution. Thus, the blend recovered contained 8.6 phr of the PET. The blend was compounded with sulfur, accelerators, and other standard rubber chemicals and cured using typical vulcanization procedures. The vulcanizate was then evaluated in an Instron tensile machine to determine its modulus, elongation at break, and break strength. It was determined that the cured blend made in this experiment had a tensile modulus which was 57 percent, 95 percent, and 27 percent greater than a cured polyisoprene control at elongations at 50 percent, 100 percent and 300 percent, respectively. The elongation at break and break strength of the cured blend were 6 percent and 7 percent, respectively, less than those of the cured polyisoprene control. The actual results of this tensile testing are as follows:

| | Tensile Modulus (Pa) | | | Elongation at Break | Break Strength |
|---|---|---|---|---|---|
| | 50% | 100% | 300% | | |
| Cured Polyisoprene (Control) | $7.5 \times 10^5$ | $1.2 \times 10^6$ | $5.6 \times 10^6$ | 604% | $1.9 \times 10^7$ |
| Cured Polyisoprene/ PET Blend | $1.2 \times 10^6$ | $2.4 \times 10^6$ | $7.0 \times 10^6$ | 570% | $1.8 \times 10^7$ |

What is claimed is:

1. A process for preparing a highly dispersed blend of polyethylene terephthalate in an elastomer which comprises (1) blending a solution of a rubber selected from the group consisting of polyiosprene, high-cis-1,4-polybutadiene, and styrene-butadiene rubber in an aliphatic organic solvent with a solution of polyethylene terephthalate in a second organic solvent selected from the group consisting of nitro-benzene, trifluoroacetic acid, acetonaphthone, hexafluoroacetone, hexafluoroisopropanol, meta-cresol, trifluoroacetic acid/methylene chloride mixed solvent systems, nitro-benzene/tetrachloroethane mixed solvent systems, hexafluoroisopropanol/chloroform mixed solvent systems, and tetrachloroethane/phenol mixed solvent systems to produce a dispersion containing said rubber and said polyethylene terephthalate, and (2) recovering the highly dispersed blend from the dispersion.

2. A process as specified in claim 1 wherein the dispersion containing the rubber and the polyester contains from about 1 phr to about 55 phr of the polyester.

3. A process as specified in claim 2 wherein the rubber is polyisoprene.

4. A process as specified in claim 2 wherein the polyethylene terephthalate has an intrinsic viscosity which is within the range of about 0.6 dl/g to about 6.0 dl/g.

5. A process as specified in claim 2 wherein the polyethylene terephthalate has an intrinsic viscosity which is within the range of about 1.0 dl/g to about 3.0 dl/g.

6. A process as specified in claim 1 wherein the dispersion containing the rubber and the polyester contains from about 2 phr to about 40 phr of the polyester.

7. A process as specified in claim 1 wherein the dispersion containing the rubber and the polyester contains from about 5 phr to about 20 phr of the polyester.

8. A process as specified in claim 1 wherein the highly dispersed blend is recovered from the dispersion by evaporating the organic solvents.

9. A process for preparing an elastomeric composition having a high modulus and high green strength which comprises (1) blending a solution of a rubber selected from the group consisting of polyisoprene, high-cis-1,4-polybutadiene, and styrene-butadiene rubber in an aliphatic organic solvent with a solution of polyethylene terephthalate in a second solvent selected from the group consisting of nitro-benzene, trifluoroacetic acid, acetonaphthone, hexafluoroacetone, hexafluoroisopropanol, meta-cresol, trifluoroacetic acid/methylene chloride mixed solvent systems, nitro-benzene/tetrachloroethane mixed solvent systems, hexafluoroisopropanol/chloroform mixed solvent systems, and tetrachloroethane/phenol mixed solvent systems to produce a rubber/polyethylene terephthalate dispersion, and (2) coagulating the rubber/polyethylene terephthalate dispersion to recover said elastomeric composition.

10. A process as specified in claim 9 wherein the rubber/polyester dispersion contains from about 1 phr to about 55 phr of the polyester.

11. A process as specified in claim 10 wherein the rubber is polyisoprene.

12. A process as specified in claim 9 wherein the rubber/polyester dispersion contains from about 2 phr to about 40 phr of the polyester.

13. A process as specified in claim 9 wherein the rubber/polyester dispersion contains from about 5 phr to about 20 phr of the polyester.

14. A process as specified in claim 9 wherein the coagulation is carried out by mixing the rubber/polyester dispersion with at least one member selected from the group consisting of alcohols and ketones.

15. A process as specified in claim 14 wherein the members selected from the group consisting of alcohols and ketones are alcohols.

* * * * *